US010220460B2

United States Patent
Katogi et al.

(10) Patent No.: US 10,220,460 B2
(45) Date of Patent: Mar. 5, 2019

(54) SUPPORTING DEVICE AND ELECTRIC DISCHARGE MACHINE

(71) Applicant: Mitsubishi Electric Corporation, Tokyo (JP)

(72) Inventors: Hidetaka Katogi, Tokyo (JP); Yasuya Kawamura, Tokyo (JP); Kimihiko Usuda, Tokyo (JP); Kiyoaki Ichihashi, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 373 days.

(21) Appl. No.: 15/028,454

(22) PCT Filed: May 25, 2015

(86) PCT No.: PCT/JP2015/064896
§ 371 (c)(1),
(2) Date: Apr. 11, 2016

(87) PCT Pub. No.: WO2016/189617
PCT Pub. Date: Dec. 1, 2016

(65) Prior Publication Data
US 2017/0259362 A1    Sep. 14, 2017

(51) Int. Cl.
*B23K 9/00* (2006.01)
*B23H 7/26* (2006.01)
(Continued)

(52) U.S. Cl.
CPC ............... *B23H 7/265* (2013.01); *B23H 7/30* (2013.01); *B23H 7/26* (2013.01); *B23H 9/14* (2013.01)

(58) Field of Classification Search
CPC . B23H 7/26; B23H 7/265; B23H 7/30; B23H 9/14
(Continued)

(56) References Cited

U.S. PATENT DOCUMENTS 6,211,480 B1    4/2001 Nagata
6,784,396 B1 *  8/2004 Suzuki ................... B23H 7/265
                                                    219/69.11

FOREIGN PATENT DOCUMENTS

DE    44 30 808 A1    3/1996
JP    2-205414 A      8/1990
(Continued)

OTHER PUBLICATIONS

International Search Report of PCT/JP2015/064896, dated Aug. 18, 2015. [PCT/ISA/210].
Written Opinion of PCT/JP2015/064896, dated Aug. 18, 2015. [PCT/ISA/237].
Communication dated Oct. 26, 2017 from the German Patent and Trademark Office in counterpart application No. 11 2015 000 164.6.

*Primary Examiner* — Dana Ross
*Assistant Examiner* — Joseph Iskra
(74) *Attorney, Agent, or Firm* — Sughrue Mion, PLLC; Richard C. Turner (57) ABSTRACT

A grip unit including holding units in each of which an upper plate is placed on a lower plate to form a V-shaped groove, a grip unit control device that can change a distance between the holding unit in a range between a distance equal to or longer than a diameter of an electrode holder with an electrode feeding mechanism and a distance equal to a diameter of an electrode, a grip unit control device moving-shaft motor that can change a height of the grip unit in a range between a height at which the holding unit are placed lower than an electrode holder brim of an electrode holder having an electrode feeding mechanism attached to an electric holder gripping device and a height to which the holding units lift up the electrode holder brim of the electrode holder having an electrode feeding mechanism attached to the electric holder gripping device, and an electrode gripping device that can grip the electrode on a (Continued)

lower side of the grip unit are included. In one of the pair of holding units, a portion of the upper plate which forms the V-shaped groove is placed on a front side and a portion of the lower plate is placed on a rear side so as to overlap with each other. In the other one of the pair of holding unit, a portion of the lower plate which forms the V-shaped groove is placed on the front side and the upper plate is placed on the rear side so as to overlap with each other.

5 Claims, 11 Drawing Sheets

(51) Int. Cl.
    *B23H 7/30*     (2006.01)
    *B23H 9/14*     (2006.01)

(58) Field of Classification Search
    USPC .................. 219/69.11, 69.15, 69.16, 69.2
    See application file for complete search history.

(56) References Cited

FOREIGN PATENT DOCUMENTS

| | | |
|---|---|---|
| JP | 10-217040 A | 8/1998 |
| JP | 2002-301623 A | 10/2002 |
| JP | 2003-71639 A | 3/2003 |
| JP | 2004-1156 A | 1/2004 |
| JP | 3815329 B2 | 8/2006 |
| JP | 2008-18499 A | 1/2008 |
| JP | 2009-18377 A | 1/2009 |
| JP | 2009-166188 A | 7/2009 |
| JP | 2009166188 * | 7/2009 |
| WO | 01/89752 A1 | 11/2001 |

* cited by examiner

SUPPORTING DEVICE AND ELECTRIC DISCHARGE MACHINE

CROSS REFERENCE TO RELATED APPLICATIONS

This application is a National Stage of International Application No. PCT/JP2015/064896 filed May 25, 2015, the contents of all of which are incorporated herein by reference in their entirety.

FIELD

The present invention relates to a supporting device to support an electrode and an electrode holder and an electric discharge machine to process a work by an electric discharge between the electrode and the work.

BACKGROUND

An electric discharge machine to process a work by an electric discharge between an electrode and the work includes a supporting device to support the electrode. As the supporting device, there are a device including a mechanism that suppresses oscillation of an electrode by holding the electrode and a device including a mechanism that feeds an electrode. The first one is used in a case of using an electrode smaller than approximately 0.1 mm in diameter and the following one is used in a case of using an electrode of approximately 0.1 mm or larger in diameter.

In Patent Literature 1, an electric discharge machine including a mechanism that feeds, from an electrode holder, an electrode of a specific diameter fed from an automatic electrode-feeding device and an intermediate guide that holds the electrode and suppresses oscillation of the electrode is disclosed.

CITATION LIST

Patent Literature

Patent Literature 1: Japanese Patent Application Laid-Open No. 2002-301623

SUMMARY

Technical Problem

However, in the invention disclosed in Patent Literature 1, an electrode having a diameter different from that of an electrode fed from an automatic electrode-feeding device cannot be fed whenever needed. Thus, there is a problem that an electrode having a fine diameter different from that of the electrode fed from the automatic electrode-feeding device cannot be fed whenever needed although utilization to feed an electrode whenever needed in a manner like a mechanical pencil and to suppress electrode oscillation is effective particularly when a diameter of the electrode is fine.

The present invention has been made in view of the foregoing and it is an object of the present invention to acquire a supporting device that can realize a form of holding an intermediate part of an electrode to control oscillation and of feeding and using an electrode whenever needed regardless of a diameter of the electrode.

Solution to Problem

In order to solve the above-described problem and to realize the object, the present invention includes an electrode holder with an electrode feeding mechanism, in which fixation of an electrode is released when an electrode holder brim provided in a flange shape in an outer peripheral part is lifted up, or an electric holder gripping device to which an electrode holder having no electrode holder brim is attached. Also, the present invention includes a grip unit including a pair of holding units in each of which an upper plate is placed on a lower plate to form a V-shaped groove. Also, the present invention includes a grip unit control device that can change a distance between the holding units in a range between a distance equal to or longer than a diameter of the electrode holder having an electrode feeding mechanism and a distance equal to a diameter of the electrode. Also, the present invention includes a grip unit control device moving-shaft motor that can change a height of the grip unit in a range between a height at which the holding units are placed lower than the electrode holder brim of the electrode holder with an electrode feeding mechanism whose holder is attached to the electric holder gripping device and a height to which the electrode holder brim of the electrode holder with an electrode feeding mechanism whose holder is attached to the electric holder gripping device is lifted up by the holding units. Also, the present invention includes an electrode gripping unit that can grip an electrode at a lower side of the grip unit. In one of the pair of holding units, the upper plate is placed at a front side and the lower plate is placed at a rear side such that the upper plate partly overlaps with the lower plate. In the other one of the pair of holding units, the lower plate is placed on the front side and the upper plate is placed on the rear side such that the upper plate partly overlaps with the lower plate.

Advantageous Effects of Invention

A supporting device according to the present invention can realize a form of holding an intermediate part of an electrode to suppress oscillation of the electrode and of feeding and using an electrode whenever needed regardless of a diameter of the electrode.

DESCRIPTION OF EMBODIMENTS

In the following, a supporting device and an electric discharge machine according to an embodiment of the present invention will be described in detail with reference to the drawings. Note that the present invention is not limited to this embodiment.

Embodiment

Figure 1:
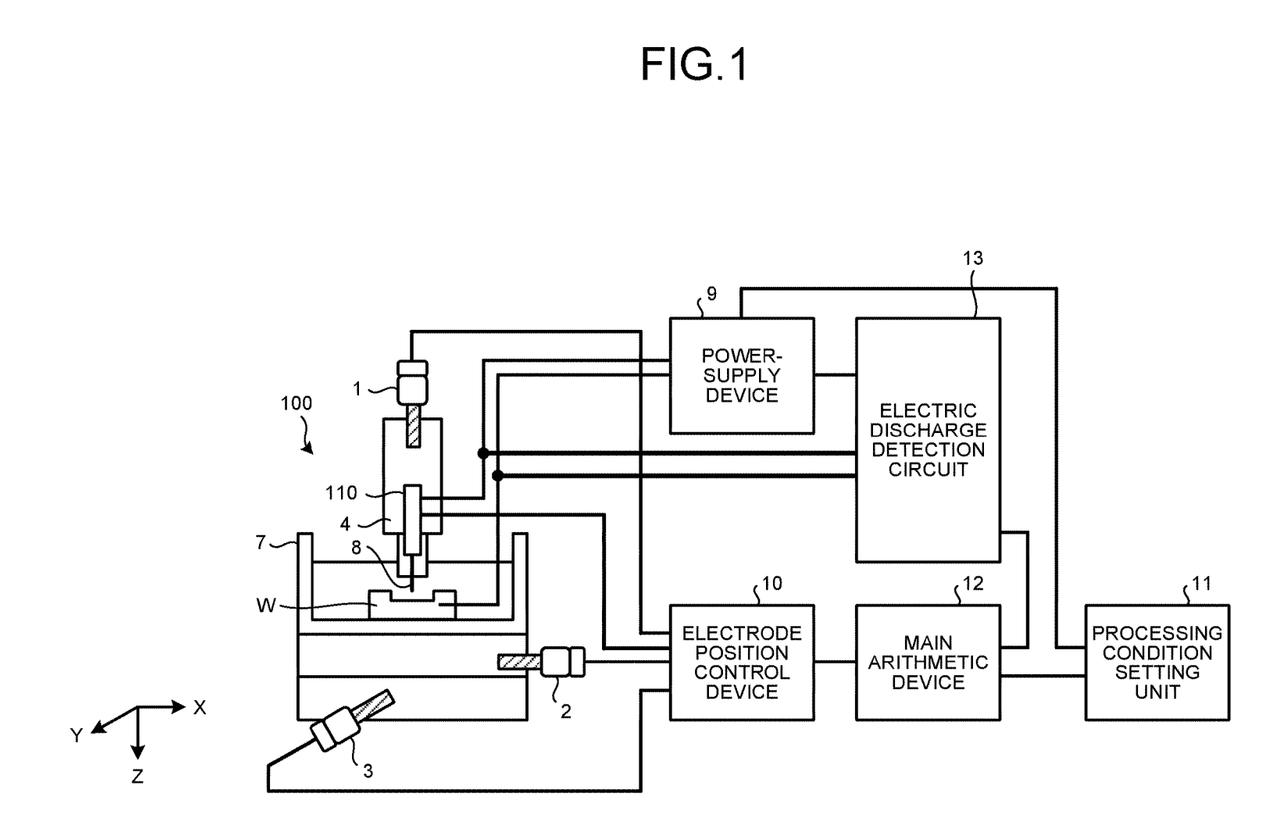
FIG. 1 is a view illustrating a configuration of an electric discharge machine according to an embodiment of the present invention.

FIG. 1 is a view illustrating a configuration of an electric discharge machine according to an embodiment of the present invention. An electric discharge machine 100 includes: a Z-axis motor 1 to move a main shaft 4 in a Z direction; an X-axis motor 2 to move a work tank 7, in which a work W is provided, in an X direction; a Y-axis motor 3 to move the work tank 7 in a Y direction; a power-supply device 9 to apply voltage between an electrode 8 provided in the main shaft 4 and the work W and to generate electric discharge; an electrode position control device 10 to give an instruction to the Z-axis motor 1, the X-axis motor 2, and the Y-axis motor 3 and to control a positional relationship between the electrode 8 and the work W; an electric discharge detection circuit 13 to monitor a voltage between the electrode 8 and the work W and to detect that electric discharge is generated; and a processing condition setting unit 11 to set a processing condition such as a processing voltage and a processed position into the power-supply device 9 and a main arithmetic device 12. Note that in FIG. 1, a +X direction corresponds to the left, a −X direction corresponds to the right, and a +Y direction corresponds to the front, a −Y direction corresponds the rear, a +Z direction corresponds to a lower direction, and a −Z direction corresponds to an upper direction.

Figure 2:
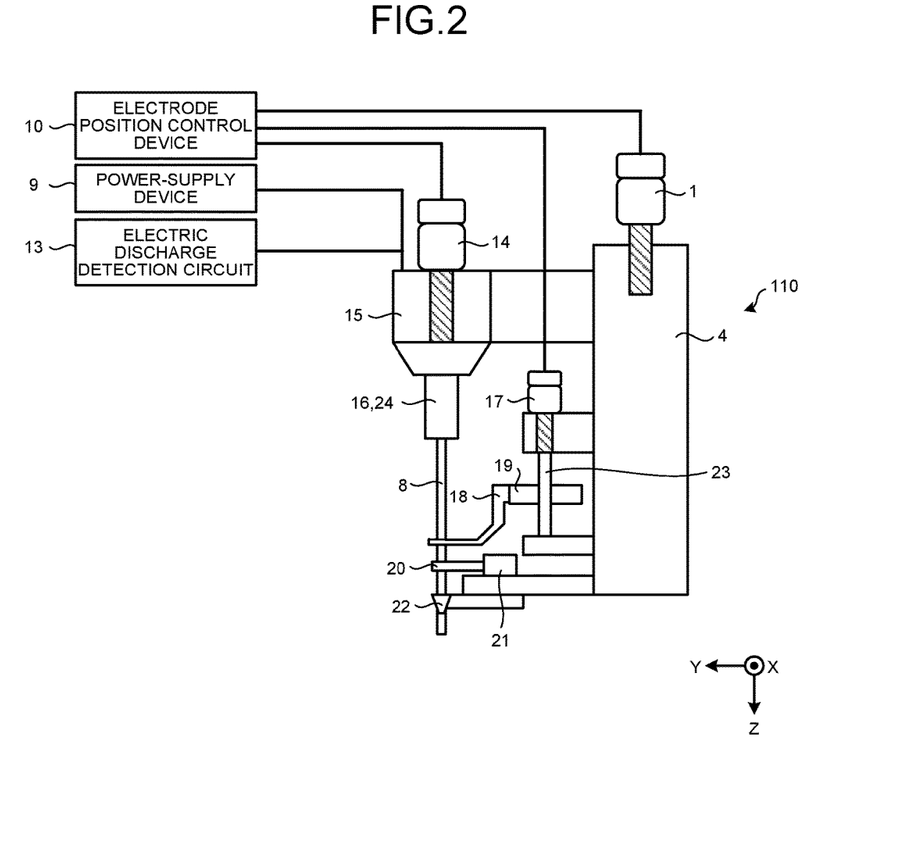
FIG. 2 is a view illustrating a configuration of a supporting device of the electric discharge machine according to the embodiment.

FIG. 2 is a view illustrating a configuration of a supporting device of the electric discharge machine according to the embodiment. A supporting device 110 includes: an electric holder gripping device 15 that is provided in the main shaft 4, moves in the Z direction along with the main shaft 4, and grips an electrode holder 16 or an electrode holder 24 having an electrode feeding mechanism; a grip unit control device 19 that drives a grip unit 18; a grip unit control device moving-shaft motor 17 that moves the grip unit 18 and the grip unit control device 19 in the Z direction along a shaft 23; an electrode gripping unit 20 that grips the electrode 8; an electrode gripping units control device 21 that drives the electrode gripping unit 20; and a guide for a leading end of an electrode 22 that guides a leading end of the electrode 8. Note that the electrode holder 16 is a general electrode holder having no electrode feeding mechanism.

The electric holder gripping device 15 mounted in the main shaft 4 can be rotated by an electric holder gripping device rotating motor 14. With the electrode 8, rotary processing can be performed on the work W.

Figure 3:
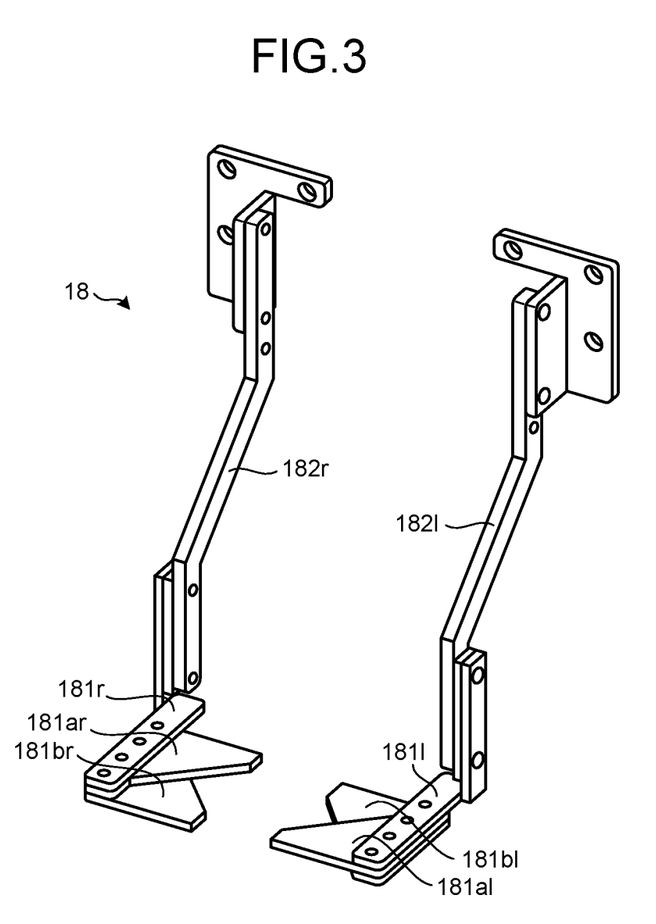
FIG. 3 is a perspective view illustrating a configuration of a grip unit of the electric discharge machine according to the embodiment.
Figure 4:
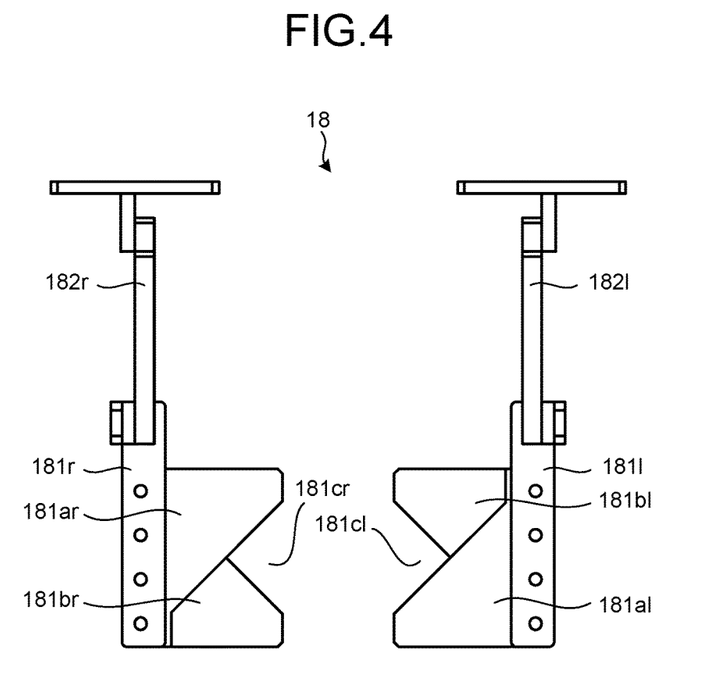
FIG. 4 is a top view illustrating the configuration of the grip unit of the electric discharge machine according to the embodiment.
Figure 5:
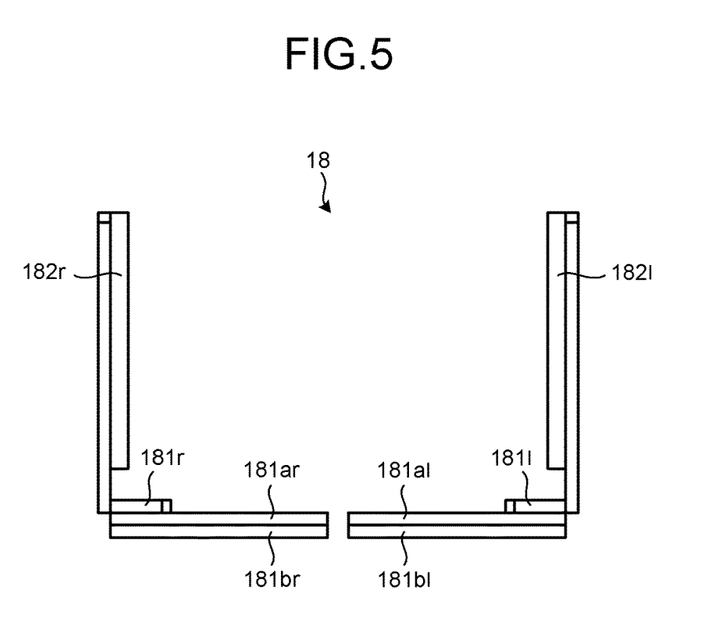
FIG. 5 is a side view illustrating the configuration of the grip unit of the electric discharge machine according to the embodiment.

FIG. 3 is a perspective view illustrating a configuration of the grip unit of the electric discharge machine according to the embodiment. FIG. 4 is a top view illustrating the configuration of the grip unit of the electric discharge machine according to the embodiment. FIG. 5 is a side view illustrating the configuration of the grip unit of the electric discharge machine according to the embodiment. The grip unit 18 includes holding units 181*l* and 181*r* that hold the electrode 8 or the electrode holder 24 having an electrode feeding mechanism therebetween and arms 182*l* and 182*r* that are connected to the grip unit control device 19. In the holding unit 181*l*, an upper plate 181*al* is placed on a lower plate 181*bl* so as to partly overlap with each other and a V-shaped groove 181*cl* is formed. In the holding unit 181*r*, an upper plate 181*ar* is placed on a lower plate 181*br* so as to partly overlap with each other and a V-shaped groove 181*cr* is formed. In the holding unit 181*l* on the left side of the device and in the holding unit 181*r* on the right side of the device, arrangements of the upper plates 181*al* and 181*ar* and the lower plates 181*bl* and 181*br* are opposite. That is, while a portion of the upper plate 181*al* which forms the V-shaped groove 181*cl* is arranged on a front side and a portion of the lower plate 181*bl* which forms the V-shaped groove 181*cl* is arranged on a rear side in the holding unit 181*l* on the left side of the device, a portion of the upper plate 181*ar* which forms the V-shaped groove 181*cr* is arranged on the rear side and a portion of the lower plate 181*br* which forms the V-shaped groove 181*cr* is arranged on the front side in the holding unit 181*r* on the right side of the device. The upper plate 181*al* of the holding unit 181*l* on the left side of the device and the upper plate 181*ar* of the holding unit 181*r* on the right side of the device are placed at the same height.

Figure 6:
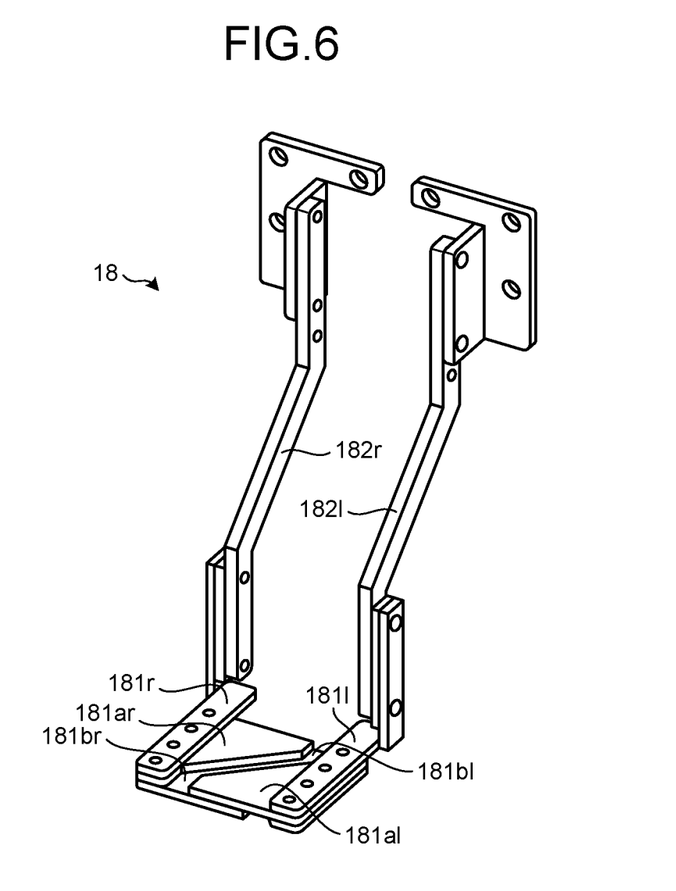
FIG. 6 is a perspective view illustrating a state in which the grip unit of the electric discharge machine according to the embodiment is closed.
Figure 7:
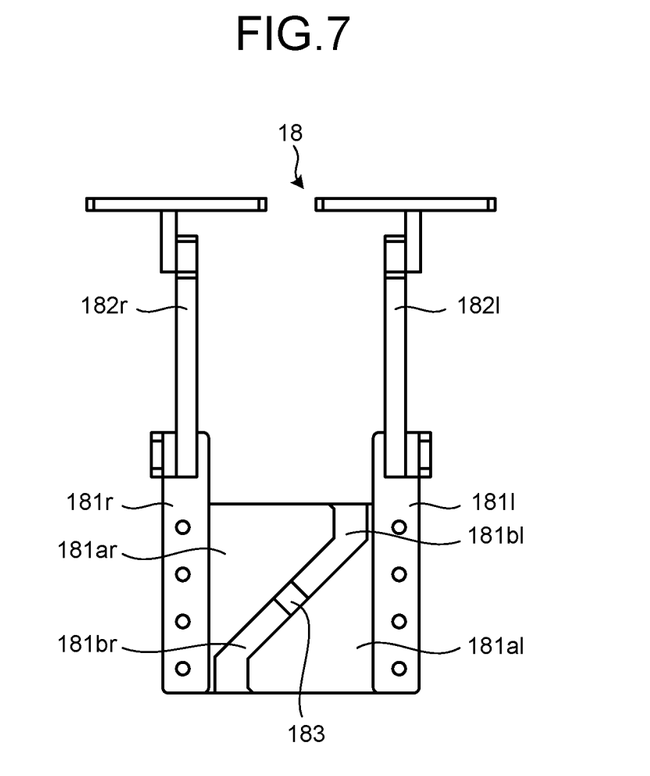
FIG. 7 is a top view of the state in which the grip unit of the electric discharge machine according to the embodiment is closed.

FIG. 6 is a perspective view illustrating a state in which the grip unit of the electric discharge machine according to the embodiment is closed. FIG. 7 is a top view illustrating a state in which the grip unit of the electric discharge machine according to the embodiment is closed. When the grip unit 18 is closed, the lower plate 181*bl* of the holding unit 181*l* on the left side of the device and the upper plate 181*ar* of the holding unit 181*r* on the right side of the device partly overlap with each other and the upper plate 181*al* of the holding unit 181*l* on the left side of the device and the lower plate 181*br* of the holding unit 181*r* on the right side of the device partly overlap with each other, whereby a guide hole 183 is formed. Since the guide hole 183 circumscribes an intermediate part of the electrode 8, it is possible to suppress an oscillation of the electrode 8 during electric discharge processing.

The grip unit control device 19 controls opening and closing of the grip unit 18 and can increase a distance between the holding unit 181*l* and the holding unit 181*r* to be longer than a diameter of the electrode holder 16 or the electrode holder 24 having an electrode feeding mechanism.

Figure 8:
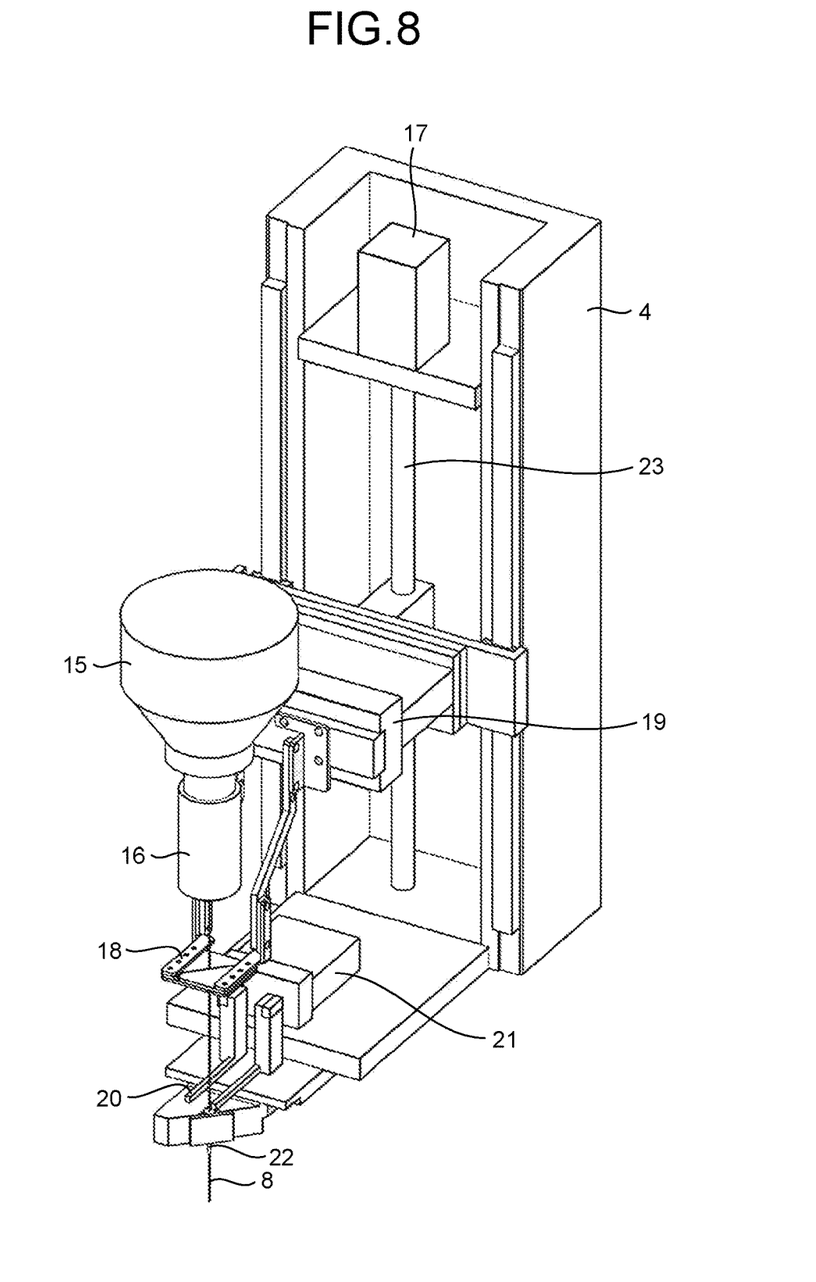
FIG. 8 is a perspective view of the supporting device of the electric discharge machine according to the embodiment.

FIG. 8 is a perspective view of the supporting device of the electric discharge machine according to the embodiment and illustrating a state in which the grip unit 18 is used as an intermediate guide. The electric holder gripping device 15 grips the electrode holder 16. To the electrode holder 16, the electrode 8 is attached and a leading end part of the electrode 8 is guided by the guide for a leading end of an electrode 22. The grip unit 18 holds the intermediate part of the electrode 8 and suppresses an oscillation of the electrode 8. The electrode gripping unit 20 is in an opened state and is not in contact with the electrode 8.

Figure 9:
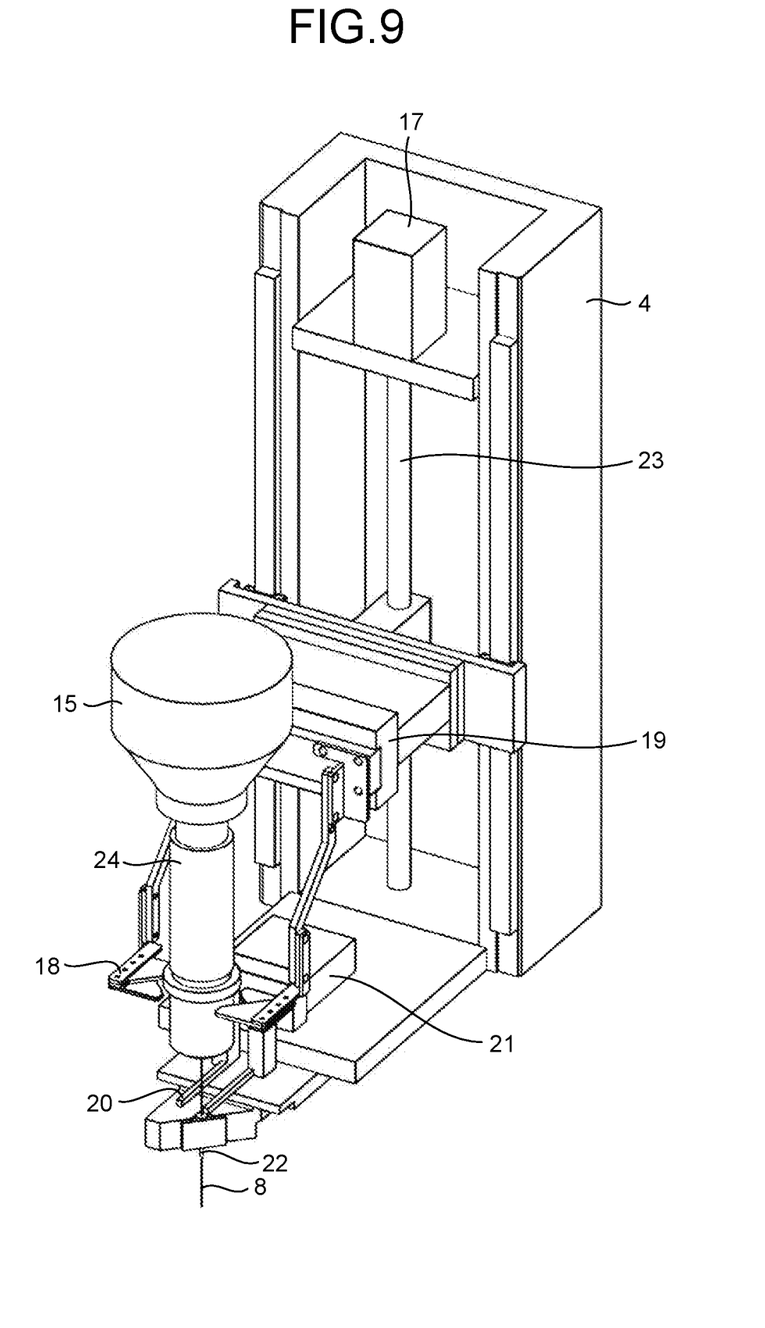
FIG. 9 is a perspective view of the supporting device of the electric discharge machine according to the embodiment.
Figure 10:
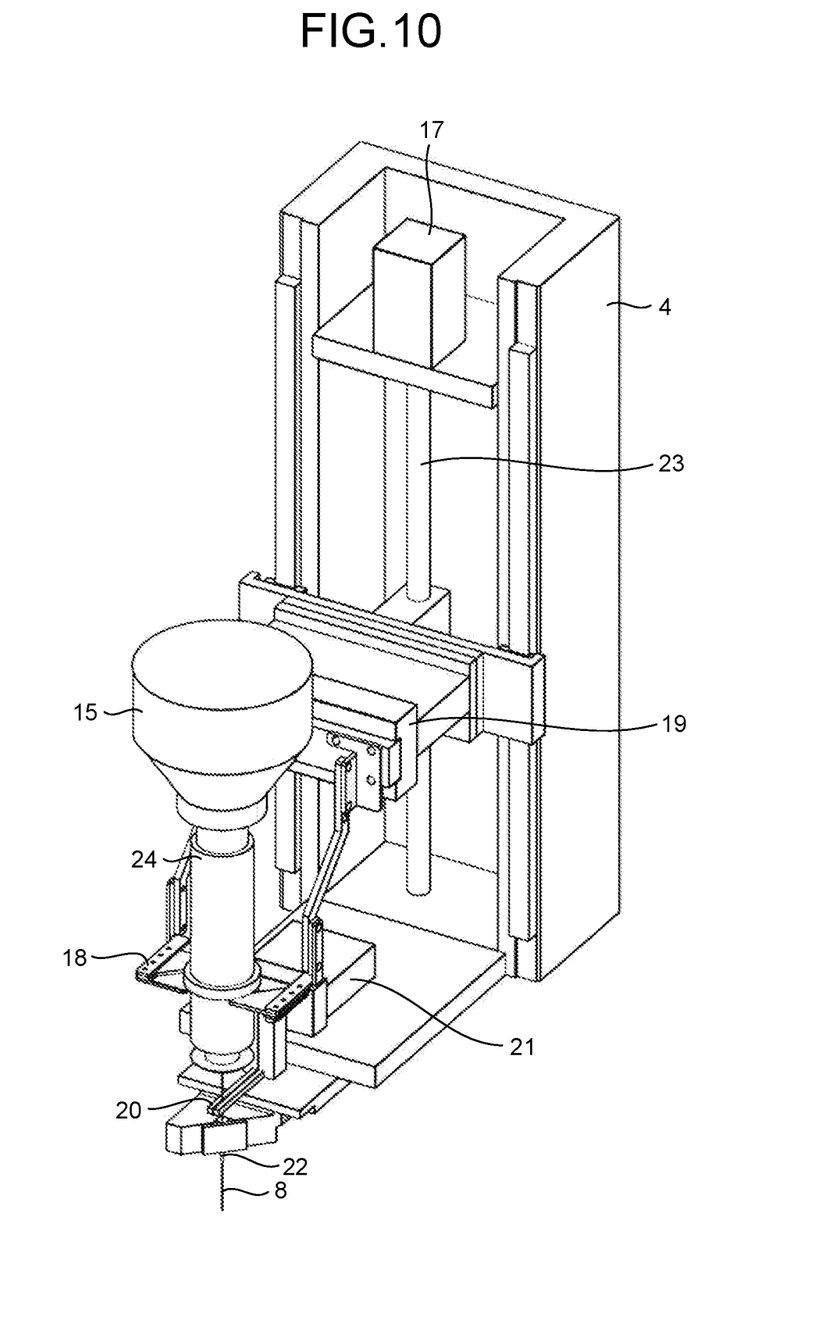
FIG. 10 is a perspective view of the supporting device of the electric discharge machine according to the embodiment.
Figure 11:
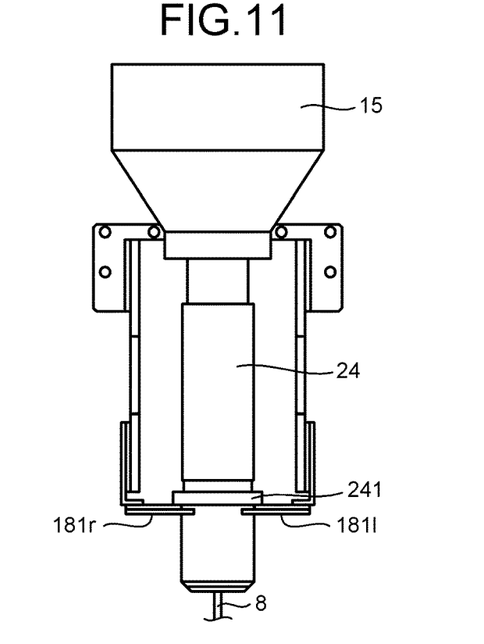
FIG. 11 is a side view of an electrode holder with an electrode feeding mechanism whose holder is used for the electric discharge machine according to the embodiment.
Figure 12:
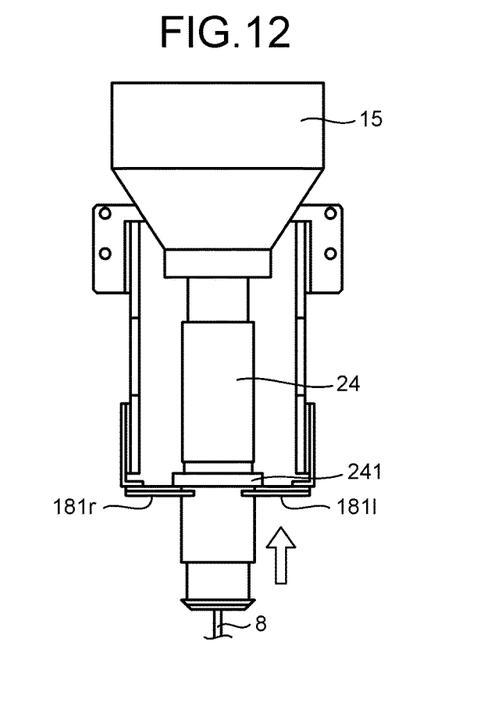
FIG. 12 is a side view of the electrode holder with an electrode feeding mechanism whose holder is used for the electric discharge machine according to the embodiment.
Figure 13:
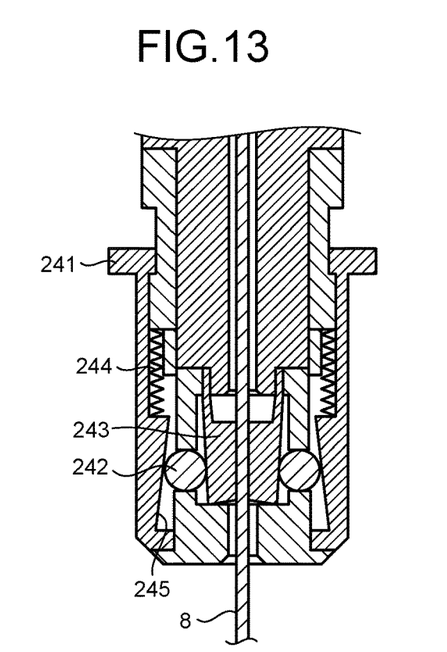
FIG. 13 is a cross-sectional view of the electrode holder with an electrode feeding mechanism whose holder is used for the electric discharge machine according to the embodiment.
Figure 14:
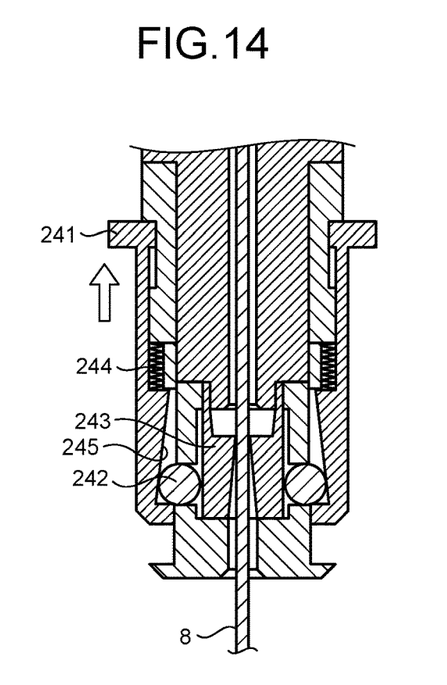
FIG. 14 is a cross-sectional view of the electrode holder with an electrode feeding mechanism whose holder is used for the electric discharge machine according to the embodiment.

Each of FIG. 9 and FIG. 10 is a perspective view of the supporting device of the electric discharge machine according to the embodiment and illustrating a state in which the grip unit 18 is used to feed the electrode. Each of FIG. 11 and FIG. 12 is a side view of the electrode holder with an electrode feeding mechanism whose holder is used in the electric discharge machine according to the embodiment. Each of FIG. 13 and FIG. 14 is a cross-sectional view of the electrode holder with an electrode feeding mechanism whose holder is used in the electric discharge machine according to the embodiment. Each of FIG. 9, FIG. 11, and FIG. 13 is a view illustrating a state in which the electrode 8 is fixed in the electrode holder 24 having an electrode feeding mechanism and each of FIG. 10, FIG. 12, and FIG. 14 is a view illustrating a state in which the electrode 8 is not fixed in the electrode holder 24 having an electrode feeding mechanism. When an electrode holder brim 241 that is provided in a flange shape on a side surface of the electrode holder 24 having an electrode feeding mechanism is lifted up, a collet pressing ball 242 in the electrode holder 24 having an electrode feeding mechanism is released and a collet in the electrode holder 243 is moved outside in a radial direction, whereby fixation of the electrode 8 is released.

Since being biased in a lower direction by a spring 244, the electrode holder brim 241 is automatically lowered when lifting force is lost. When the electrode holder brim 241 is lowered, the collet pressing ball 242 is pushed by a tapered surface 245 to a center side in the radial direction and the collet in the electrode holder 243 sandwiches and fixes the electrode 8. Note that the structure of the electrode feeding mechanism is an example. A different known structure may be applied as long as force to press the electrode is released when the electrode holder brim is lifted up, and the electrode is fixed when force to lift up the electrode holder brim is lost.

When the grip unit 18 is raised after a distance between the holding parts 181*l* and 181*r* is made longer than the electrode holder 24 having an electrode feeding mechanism and shorter than the electrode holder brim 241 and the grip unit control device moving-shaft motor 17 is driven, the holding parts 181*l* and 181*r* abut to the electrode holder brim 241 and lift the electrode holder brim 241, whereby fixation of the electrode 8 is released. In a case where the electrode gripping unit 20, which is an electrode gripping unit, is closed by the electrode gripping unit control device 21 and grips the electrode 8, when the Z-axis motor 1 is driven, the electrode 8 is pulled out from the electrode holder 24 having an electrode feeding mechanism. When the electrode gripping unit 20 is opened by the electrode gripping unit control device 21 and the grip unit 18 is lowered by the grip unit control device moving-shaft motor 17 after the electrode 8 is pulled out from the electrode holder 24 having an electrode feeding mechanism, the electrode 8 is fixed. Then, by driving the Z-axis motor 1 and lowering the electric holder gripping device 15, pulling out of the electrode 8 is completed.

Since the upper plate 181*al* and the upper plate 181*ar* of the holding unit 181*l* on the left side of the device and the holding unit 181*r* on the right side of the device are at the same height in the grip unit 18, it is possible to apply upward force equally to right and left sides of the electrode holder brim 241 when the electrode holder brim 241 is lifted up by the grip unit 18. Thus, in a case of lifting up the electrode holder brim 241, the electrode holder brim 241 is not inclined to be stuck.

Also, in the electric discharge machine 100 according to the embodiment, when the holding units 181*l* and 181*r* of the supporting device 110 are opened to be equal to or wider than a diameter of the electrode holder 16 or the electrode holder 24 having an electrode feeding mechanism, it becomes possible to perform an operation of replacing the electrode holder 16 or the electrode holder 24 having an electrode feeding mechanism, that is, to perform an electrode replacement. By using an automatic electrode replacement device, an automatic operation by successive electrode replacement becomes possible. That is, an operation of pulling the electrode holder 16 or the electrode holder 24 having an electrode feeding mechanism in a lower direction of the electric holder gripping device 15 and pulling the holder to the front side of the device can be performed automatically by using the automatic electrode replacement device. Note that by providing a sensor to identify a kind of an attached electrode holder to the electric holder gripping device 15, the electric discharge machine 100 can prevent the supporting device 110 from performing an operation of feeding the electrode 8 in a state in which the electrode holder 16 is attached to the electric holder gripping device 15 or from performing an operation in a form of an intermediate guide in a state in which the electrode holder 24 having an electrode feeding mechanism is attached to the electric holder gripping device 15.

Note that in a case of using the grip unit 18 for feeding the electrode, only the upper plate 181*al* and the upper plate 181*ar* are in contact with the electrode holder brim. Thus, by making the upper plates 181*al* and 181*ar* thicker than the lower plates 181*bl* and 181*br*, it is possible to prevent deformation of the upper plates 181*al* and 181*ar* and to increase durability of the device.

As described above, the electric discharge machine 100 according to the embodiment includes the supporting device 110 that supports the electrode 8, and the electric holder gripping device 15 that grips the electrode holder 16 or the electrode holder 24 having an electrode feeding mechanism. The supporting device 110 includes: the grip unit 18 which includes the pair of holding units 181*l* and 181*r*, in which the upper plates 181*al* and 181*ar* are respectively placed on the lower plates 181*bl* and 181*br* to form the V-shaped grooves 181*cl* and 181*cr*, and in which a portion of the upper plate 181*al* which forms the V-shaped groove 181*cl* is placed on the front side and a portion of the lower plate 181*bl* which forms the V-shaped groove 181*cl* is placed on the rear side so as to partly overlap with each other in the holding unit 181*l* and a portion of the lower plate 181*br* which forms the V-shaped groove 181*cr* is placed on the front side and a portion of the upper plate 181*ar* which forms the V-shaped groove 181*cr* is placed on the rear side so as to partly overlap with each other in the holding unit 181*r*; and the grip unit control device 19 that can change a distance between the holding units 181*l* and 181*r*. Thus, in a case of making the electric holder gripping device 15 grip the electrode holder 16, it is possible to perform processing while suppressing an oscillation of the intermediate part of the electrode 8. When the electrode holder 24 having an electrode feeding mechanism is attached to the electric holder gripping device 15, it is possible to feed the electrode 8 whenever needed to perform processing.

In the above description, a configuration including the electrode gripping unit 20 has been described as an example. However, the electrode gripping unit 20 can be omitted as long as an intermediate guide is separately provided at a lower side of the grip unit 18. That is, in an operation of feeding the electrode 8, it is possible to feed the electrode by gripping the electrode 8 and raising the electric holder gripping device 15 while using a different intermediate guide as an electrode gripping unit instead of the electrode gripping unit 20 after lifting up the electrode holder brim 241 with the grip unit 18. Also, an intermediate guide may be provided separately from the electrode gripping unit 20. That is, an operation of feeding the electrode 8 can be performed as long as at least one mechanism that can grip the electrode 8 is included at a lower side of the grip unit 18. By providing the intermediate guide separately from the grip unit 18, when the electrode holder 16 is attached to the electric holder gripping device 15, an oscillation can be suppressed at two places in the intermediate part of the electrode 8. Thus, an effect of suppressing the oscillation of the electrode 8 is increased compared to that of the supporting device 110. Also, when the electrode holder 24 having an electrode feeding mechanism is attached to the electric holder gripping device 15, it is possible to feed the electrode 8 from the electrode holder 24 having an electrode feeding mechanism by griping the electrode 8 with the intermediate guide and raising the electric holder gripping device 15 after lifting up the electrode holder brim 241 with the grip unit 18.

In such a manner, in the electric discharge machine 100 according to the embodiment, the grip unit 18 can be used as an intermediate guide or as an electrode feeding mechanism. Thus, it is possible to perform processing while suppressing an oscillation of the intermediate part of the electrode 8 and to perform processing while feeding the electrode 8 whenever needed. That is, the supporting device 110 can suppress an oscillation of the intermediate part of the electrode 8 and can feed the electrode 8 whenever needed.

The electric discharge machine 100 according to the embodiment can feed the electrode 8 with a simple mechanism of opening the holding units 181*l* and 181*r* wider than a diameter of the electrode holder 24 having an electrode feeding mechanism and of lifting up the electrode holder brim 241. Thus, it is possible to prevent a production cost of the device from being increased. Also, the electrode 8 can be fed and used whenever needed regardless of a diameter of the electrode as long as the electrode 8 can be attached to the electrode holder 24 having an electrode feeding mechanism.

The supporting device 110 of the electric discharge machine 100 according to the embodiment includes the electrode holder 24 having an electrode feeding mechanism, in which fixation of the electrode is released when the electrode holder brim 241 provided in a flange shape in an outer peripheral part is lifted up, or the electric holder gripping device 15 to which the electrode holder 16 having no electrode holder brim is attached. Also, the supporting device 110 includes the grip unit 18 including the pair of holding units 181*l* and 181*r* in which the upper plates 181*al* and 181*ar* are placed on the lower plates 181*bl* and 181*br* to form V-shaped grooves 181*cl* and 181*cr*. Also, the supporting device 110 includes the grip unit control device 19 that can change a distance between the holding unit 181*l* and 181*r* in a range between a distance equal to or longer than a diameter of the electrode holder 24 having an electrode feeding mechanism and a distance equal to a diameter of the electrode 8. Also, the supporting device 110 includes the grip unit control device moving-shaft motor 17 that can change a height of the grip unit 18 in a range between a height at which the holding units 181*l* and 181*r* are placed on a lower side of the electrode holder brim 241 of the electrode holder 24 having an electrode feeding mechanism attached to the electric holder gripping device 15 and a height to which the electrode holder brim 241 of the electrode holder 24 having an electrode feeding mechanism attached to the electric holder gripping device 15 is lifted up by the holding units 181*l* and 181*r*. Also, the supporting device 110 includes the electrode gripping unit 20 that can grip the electrode 8 on a lower side of the holding units 181*l* and 181*r*. In the holding unit 181*l*, a portion of the upper plate 181*al* which forms the V-shaped groove 181*cl* is placed on the front side and a portion of the lower plate 181*bl* which forms the V-shaped groove 181*cl* is placed on the rear side so as to partly overlap with each other. In the holding unit 181*r*, a portion of the lower plate 181*br* which forms the V-shaped groove 181*cr* is placed on the front side and a portion of the upper plate 181*ar* which forms the V-shaped groove 181*cr* is placed on the rear side so as to partly overlap with each other. Thus, the supporting device 110 can use the grip unit 18 as an intermediate guide or for feeding an electrode from the electrode holder 24 having an electrode feeding mechanism. Thus, the electric discharge machine 100 including the supporting device 110 can perform electric discharge processing in a form of supporting the intermediate part of the electrode 8 in a form of feeding the electrode 8 whenever needed regardless of a diameter of the electrode 8.

The configuration described in the above embodiment is an example of contents of the present invention. It is possible to make a combination with a different known technology or to omit or modify a part of the configuration within the spirit and the scope of the preset invention.

REFERENCE SIGNS LIST

1 Z-axis motor, 2 X-axis motor, 3 Y-axis motor, main shaft, 7 work tank, 8 electrode, 9 power-supply device, 10 electrode position control device, 11 processing condition setting unit, 12 main arithmetic device, 13 electric discharge detection circuit, 14 electric holder gripping device rotating motor, 15 electric holder gripping device, 16 electrode holder, 17 grip unit control device moving-shaft motor, 18 grip unit, grip unit control device, 20 electrode gripping unit, electrode gripping unit control device, 22 guide for a leading end of an electrode, 23 shaft, 24 electrode holder with an electrode feeding mechanism, 181*l*, 181*r* holding unit, 181*al*, 181*ar* upper plate, 181*bl*, 181*br* lower plate, 181*cl*, 181*cr* V-shaped groove, 182*l*, 182*r* arm, 183 guide hole, 241 electrode holder brim, 242 collet pressing ball, 243 collet in an electrode holder, 244 spring, 245 tapered surface

The invention claimed is:
1. A supporting device comprising:
an electric holder gripping device to which an electrode holder having an electrode feeding mechanism is attached, wherein fixation of an electrode is released when an electrode holder brim provided in a flange shape in an outer peripheral part is lifted up;
a grip unit including a pair of holding units disposed at a same height in the grip unit, the pair of holding units corresponding to a first holding unit and a second holding unit, each of the first holding unit and the second holding unit including an upper plate and a lower plate, the upper plate being disposed on the lower plate so as to partly overlap with each other to form a V-shaped groove;
a grip unit control device configured to change a distance between the first holding unit and the second holding unit in a range between a first distance and a second distance, the first distance being greater than or equal to a diameter of the electrode holder, the second distance being equal to a diameter of the electrode;

a grip unit control device moving-shaft motor configured to change a height of the grip unit in a range between a first height, at which the pair of holding units are placed lower than the electrode holder brim of the electrode holder, and a second height to which the pair of holding units lift up the electrode holder brim of the electrode holder; and an electrode gripping unit configured to grip the electrode at a lower side of the grip unit, wherein a portion of the upper plate which forms the V-shaped groove is placed on a front side and a portion of the lower plate which forms the V-shaped groove is placed on a rear side so as to partly overlap with each other in one of the pair of holding units, and a portion of the lower plate which forms the V-shaped groove is placed on the front side and a portion of the upper plate which forms the V-shaped groove is placed on the rear side so as to partly overlap with each other in the other one of the pair of holding units.

2. The supporting device according to claim 1, wherein the upper plates are thicker than the lower plates.

3. The supporting device according to claim 1, wherein the electrode gripping unit is an intermediate guide that grips the electrode at a lower side of the grip unit.

4. An electric discharge machine comprising:
the supporting device according to claim 1.

5. An electric discharge machine comprising:
a supporting device that supports an electrode; and
a gripping device that grips an electrode holder that is attached to the gripping device,
wherein the supporting device includes
a grip unit including a pair of holding unit disposed at a same height in the grip unit, the pair of holding units corresponding to a first holding unit and a second holding unit, each of the first holding unit and the second holding unit including an upper plate and a lower plate, the upper plate being disposed on the lower plate so as to partly overlap with each other to form a V-shaped groove, a portion of the upper plate which forms the V-shaped groove being placed on a front side and a portion of the lower plate which forms the V-shaped groove being placed on a rear side so as to partly overlap with each other in one of the pair of holding unit, and a portion of the lower plate which forms the V-shaped groove being placed on the front side and a portion of the upper plate which forms the V-shaped groove being placed on the rear side so as to partly overlap with each other in the other one of the pair of holding units, and
a grip unit control device configured to control a distance between the holding units.

* * * * *